(12) United States Patent
Dempsey et al.

(10) Patent No.: US 9,154,239 B2
(45) Date of Patent: Oct. 6, 2015

(54) CO-LOCATED FREQUENCY MANAGEMENT AND MITIGATION

(71) Applicant: HARRIS CORPORATION, Melbourne, FL (US)

(72) Inventors: Melissa S. Dempsey, Rochester, NY (US); Cory N. Fitzsimmons, Avon, NY (US); Richard J. Buckley, Henrietta, NY (US)

(73) Assignee: Harris Corporation, Melbourne, FL (US)

( * ) Notice: Subject to any disclaimer, the term of this patent is extended or adjusted under 35 U.S.C. 154(b) by 374 days.

(21) Appl. No.: 13/770,156

(22) Filed: Feb. 19, 2013

(65) Prior Publication Data

US 2014/0235174 A1 Aug. 21, 2014

(51) Int. Cl.
| | |
|---|---|
| H04B 1/00 | (2006.01) |
| H04B 15/06 | (2006.01) |
| H04B 1/525 | (2015.01) |
| H04B 1/10 | (2006.01) |
| H04B 17/11 | (2015.01) |
| H04B 1/3816 | (2015.01) |
| H04B 17/14 | (2015.01) |
| H04B 17/21 | (2015.01) |

(52) U.S. Cl.
CPC .............. *H04B 15/06* (2013.01); *H04B 1/1036* (2013.01); *H04B 1/525* (2013.01); *H04B 17/11* (2015.01); *H04B 1/3816* (2013.01); *H04B 17/14* (2015.01); *H04B 17/21* (2015.01)

(58) Field of Classification Search
CPC ...... H04B 15/00; H04B 1/1027; H04B 1/525; H04B 1/406; H04B 15/02; H04B 17/21; H04B 17/327; H04B 17/382; H04B 1/1036; H04B 1/3805; H04B 2201/70709; H04B 2201/709709
USPC ........................................................ 455/63.1
See application file for complete search history.

(56) References Cited

U.S. PATENT DOCUMENTS

| | | | | |
|---|---|---|---|---|
| 5,630,223 | A | * | 5/1997 | Bahu et al. .................... 455/296 |
| 5,729,829 | A | * | 3/1998 | Talwar et al. ................. 455/63.1 |
| 2010/0008336 | A1 | | 1/2010 | Keidar et al. |

(Continued)

FOREIGN PATENT DOCUMENTS

| | | |
|---|---|---|
| EP | 1521379 A1 | 4/2005 |
| EP | 2509230 A1 | 10/2012 |
| WO | 2009145887 A1 | 12/2009 |

OTHER PUBLICATIONS

International Search Report mailed May 16, 2014, Application Serial No. PCT/US2014/017017 in the name of Harris Corporation.

*Primary Examiner* — Ajibola Akinyemi
(74) *Attorney, Agent, or Firm* — Robert J. Sacco, Esq.; Fox Rothschild LLP

(57) ABSTRACT

System (201) for mitigating co-site interference includes a co-site filter bank (208) containing filters ($206_1$, $206_2$, ... $206_n$) which can be optionally selectively inserted in an antenna input/output path ($205_1$, $205_2$, ... $205_n$) of two or more transceivers ($204_1$, $204_2$, ... $204_n$). A control system (900) receives information concerning the transceivers. Based on the information, the control system determines whether optional RF filtering should be used to limit RF signals which are communicated to or from the transceivers so as to mitigate co-site interference.

13 Claims, 6 Drawing Sheets

(56) References Cited

U.S. PATENT DOCUMENTS

2010/0304685 A1   12/2010   Wietfeldt et al.
2011/0237246 A1*  9/2011   Sen .......................... 455/426.1
2012/0009886 A1   1/2012   Poulin
2013/0003671 A1   1/2013   Wang et al.

* cited by examiner

| Radio Module 2 Frequency (MHz) | Radio Module 1 Frequency (MHz) | | | | | | | |
|---|---|---|---|---|---|---|---|---|
| | 30-107.999 | 108-224.999 | 225-339.999 | 340-419.999 | 420-449.999 | 790-860 | 1350-1525 | 1625-1890 |
| 30-107.999 | RM1, B0 / RM2, B0 | RM1, B1 / RM2, B0 | RM1, B2 / RM2, B0 | RM1, B3 / RM2, B0 | RM1, B4 / RM2, B0 | RM1, B5 / RM2, B0 | RM1, B6 / RM2, B0 | RM1, B7 / RM2, B0 |
| 108-224.999 | RM1, B0 / RM2, B1 | RM1, B1 / RM2, B1 | RM1, B2 / RM2, B1 | RM1, B3 / RM2, B1 | RM1, B4 / RM2, B1 | RM1, B5 / RM2, B1 | RM1, B6 / RM2, B1 | RM1, B7 / RM2, B1 |
| 225-339.999 | RM1, B0 / RM2, B2 | RM1, B1 / RM2, B2 | RM1, B2 / RM2, B2 | RM1, B3 / RM2, B2 | RM1, B4 / RM2, B2 | RM1, B5 / RM2, B2 | RM1, B6 / RM2, B2 | RM1, B7 / RM2, B2 |
| 340-419.999 | RM1, B0 / RM2, B3 | RM1, B1 / RM2, B3 | RM1, B2 / RM2, B3 | RM1, B3 / RM2, B3 | RM1, B4 / RM2, B3 | RM1, B5 / RM2, B3 | RM1, B6 / RM2, B3 | RM1, B7 / RM2, B3 |
| 420-449.999 | RM1, B0 / RM2, B4 | RM1, B1 / RM2, B4 | RM1, B2 / RM2, B4 | RM1, B3 / RM2, B4 | RM1, B4 / RM2, B4 | RM1, B5 / RM2, B4 | RM1, B6 / RM2, B4 | RM1, B7 / RM2, B4 |
| 790-860 | RM1, B0 / RM2, B5 | RM1, B1 / RM2, B5 | RM1, B2 / RM2, B5 | RM1, B3 / RM2, B5 | RM1, B4 / RM2, B5 | RM1, B5 / RM2, B5 | RM1, B6 / RM2, B5 | RM1, B7 / RM2, B5 |
| 1350-1525 | RM1, B0 / RM2, B6 | RM1, B1 / RM2, B6 | RM1, B2 / RM2, B6 | RM1, B3 / RM2, B6 | RM1, B4 / RM2, B6 | RM1, B5 / RM2, B6 | RM1, B6 / RM2, B6 | RM1, B7 / RM2, B6 |
| 1625-1890 | RM1, B0 / RM2, B7 | RM1, B1 / RM2, B7 | RM1, B2 / RM2, B7 | RM1, B3 / RM2, B7 | RM1, B4 / RM2, B7 | RM1, B5 / RM2, B7 | RM1, B6 / RM2, B7 | RM1, B7 / RM2, B7 |

FIG. 4

| | | Radio Module 1 Frequency (MHz) | | | | | | | |
|---|---|---|---|---|---|---|---|---|---|
| | | 30-107.999 | 108-224.999 | 225-339.999 | 340-419.999 | 420-449.999 | 790-860 | 1350-1525 | 1625-1890 |
| Radio Module 2 Frequency (MHz) | 30-107.999 | RM1, B0 | RM1, B0 | RM1, B2 | RM1, Bypass | RM1, Bypass | RM1, Bypass | RM1, Bypass | RM1, Bypass |
| | | RM2, B0 | RM2, B0 | RM2, B0 | RM2, Bypass | RM2, Bypass | RM2, Bypass | RM2, Bypass | RM2, Bypass |
| | 108-224.999 | RM1, B0 | RM1, B1 | RM1, B2 | RM1, B3 | RM1, Bypass | RM1, Bypass | RM1, Bypass | RM1, Bypass |
| | | RM2, B1 | RM2, B1 | RM2, B1 | RM2, B1 | RM2, Bypass | RM2, Bypass | RM2, Bypass | RM2, Bypass |
| | 225-339.999 | RM1, B0 | RM1, B1 | RM1, B2 | RM1, B3 | RM1, B4 | RM1, Bypass | RM1, Bypass | RM1, Bypass |
| | | RM2, B2 | RM2, B2 | RM2, B2 | RM2, B2 | RM2, Bypass | RM2, Bypass | RM2, Bypass | RM2, Bypass |
| | 340-419.999 | RM1, Bypass | RM1, B1 | RM1, B2 | RM1, B3 | RM1, B4 | RM1, B5 | RM1, Bypass | RM1, Bypass |
| | | RM2, Bypass | RM2, B3 | RM2, B3 | RM2, B3 | RM2, B3 | RM2, B3 | RM2, Bypass | RM2, Bypass |
| | 420-449.999 | RM1, Bypass | RM1, Bypass | RM1, B2 | RM1, B3 | RM1, B4 | RM1, B5 | RM1, B6 | RM1, Bypass |
| | | RM2, Bypass | RM2, Bypass | RM2, B4 | RM2, B4 | RM2, B4 | RM2, B4 | RM2, B4 | RM2, Bypass |
| | 790-860 | RM1, Bypass | RM1, Bypass | RM1, Bypass | RM1, B3 | RM1, B4 | RM1, B5 | RM1, B6 | RM1, B7 |
| | | RM2, Bypass | RM2, Bypass | RM2, Bypass | RM2, B5 | RM2, B5 | RM2, B5 | RM2, B5 | RM2, B5 |
| | 1350-1525 | RM1, Bypass | RM1, Bypass | RM1, Bypass | RM1, Bypass | RM1, B4 | RM1, B5 | RM1, B6 | RM1, B7 |
| | | RM2, Bypass | RM2, Bypass | RM2, Bypass | RM2, Bypass | RM2, B6 | RM2, B6 | RM2, B6 | RM2, B6 |
| | 1625-1890 | RM1, Bypass | RM1, Bypass | RM1, Bypass | RM1, Bypass | RM1, Bypass | RM1, B5 | RM1, B6 | RM1, B7 |
| | | RM2, Bypass | RM2, Bypass | RM2, Bypass | RM2, Bypass | RM2, Bypass | RM2, B7 | RM2, B7 | RM2, B7 |

FIG. 5

CO-LOCATED FREQUENCY MANAGEMENT AND MITIGATION

BACKGROUND OF THE INVENTION

1. Statement of the Technical Field

The inventive arrangements relate to RF systems and more particularly to systems in which multiple transmitters and receivers are located in close physical proximity.

2. Description of the Related Art

When there are multiple RF transmitters and receivers located at the same physical location, there is a significant potential for a transmitter to interfere with a receiver at that location. Such interference is usually caused by strong signals from the transmitter having an adverse affect on the operation of sensitive receiver circuitry. The interference can arise regardless of whether the receiver and transmitter are designed to operate on the same band or a different band. In some instances the occurrence of such interference can be obvious whereas in other instances the effects of the interference can be more subtle. For example, intermodulation products created in certain non-linear receiver components (e.g. mixers) can create problems which are difficult to identify.

Identifying and understanding co-site interference can be a complex process which involves every part of the communication systems involved. For example, the analysis process can require analyzing the transmitter signal, modeling the performance of receive and transmit antennas, receiver front end and characteristics, and RF mixers. All such factors must be considered and any modeling inaccuracies can result in a failure to identify potential interference issues. This creates a co-site frequency interference problem which, for many users, can be difficult to identify, avoid and solve. Consider that a user in such a scenario must not merely analyze the problem to identify potential interference issues, but must also then determine what action is appropriate to alleviate the problems. The expertise and equipment required to accomplish the foregoing is frequently beyond the capabilities of many users.

SUMMARY OF THE INVENTION

Embodiments of the invention concern a method for mitigating co-site interference among two or more transceivers communicating using RF signals and located in close physical proximity. The method begins by receiving at a computer processor information concerning at least an operating frequency and a transmitter power output associated with each of the transceivers. Thereafter, the computer processor determines based on the information whether optional RF filtering should be used to limit RF signals which are communicated to or from each transceiver in order mitigate interference among the transceivers. If the determining step indicates that the optional RF filtering should be used, then RF filtering is automatically selectively performed to mitigate the interference.

The invention also concerns a system for mitigating co-site interference among two or more transceivers that communicate using RF signals and which are located in close physical proximity. The system includes a co-site filter bank comprising a plurality of RF filters which can be optionally selectively inserted in an antenna input/output path of the transceivers. A computer processor is configured to receive information concerning at least an operating frequency and a transmitter power output associated with each of the transceivers. Based on the information, the computer processor determines whether optional RF filtering should be used to limit RF signals which are communicated to or from each of the plurality of transceivers so as to mitigate co-site interference. The computer processor is configured to automatically selectively perform the RF filtering using the co-site filter bank which is dynamically controlled by the processor. The filter bank is used by the processor to mitigate co-site interference if the computer processor determines that the optional RF filtering should be used.

BRIEF DESCRIPTION OF THE DRAWINGS

Embodiments will be described with reference to the following drawing figures, in which like numerals represent like items throughout the figures, and in which:

FIG. 4 is an exemplary look-up table which specifies appropriate RF filtering for mitigating co-site interference in a scenario where there is minimal system knowledge available.

FIG. 5 is an exemplary look-up table which specifies appropriate RF filtering for mitigating co-site interference in a scenario where there is moderate system knowledge available, and where the table has been modified in accordance with the available information.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
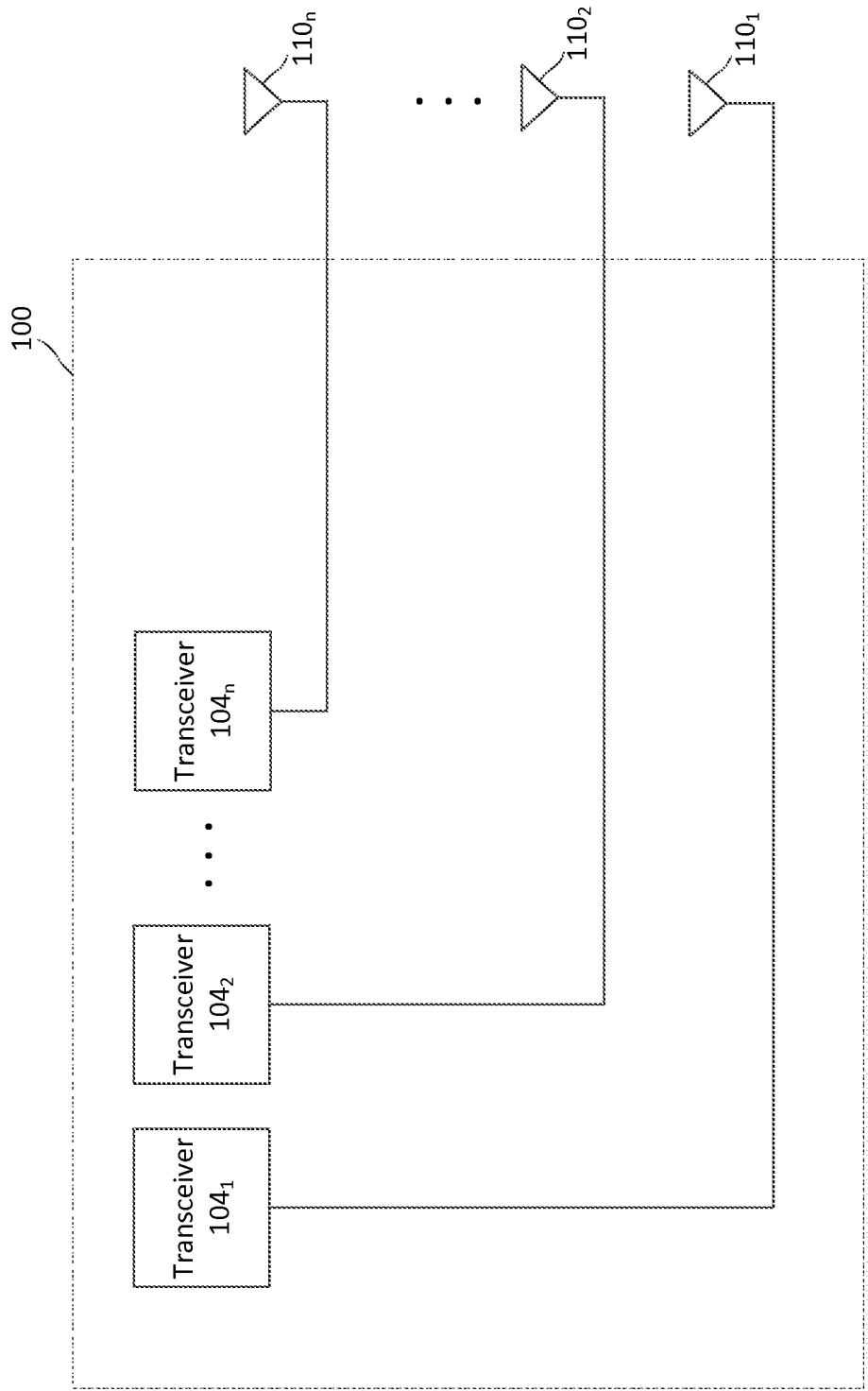
FIG. 1 is a drawing that is useful for understanding a scenario in which co-site interference can occur.

Referring now to FIG. 1 there is shown an exemplary scenario in which a plurality of transceivers $104_1$, $104_2$, ... $104_n$ are located at the same physical site 100. The transceivers can be located at the same geographic location (a communication facility), disposed on the same physical platform (e.g. a vehicle), or they can be integrated into the same device (e.g., a multi-transceiver radio). Regardless of the scenario, the close proximity of the plurality of transceivers and their associated antennas $110_1$, $110_2$, ... $110_n$ in each case can potentially cause a performance degradation. The performance degradation typically involves relatively strong signals from a transmitter having an adverse affect on the operation of sensitive receiver circuitry. For example transmitter phase noise, harmonics and spurious emissions can all cause problems in nearby receivers, particularly when there is insufficient isolation among the plurality of antennas $110_1$, $110_2, \ldots 110_n$ associated with such devices. The extent of this problem and the means for mitigating same will depend on a variety of factors including the operating frequency of a transmitter and receiver, the performance characteristics of such devices, and the degree of isolation among their associated antennas. The complexity of the problem and the number of variables creates a co-site interference problem that can be difficult for users to identify, avoid and detect, particularly in situations where the operating conditions (e.g. frequency, power output, waveform) are constantly subject to change.

Figure 2:
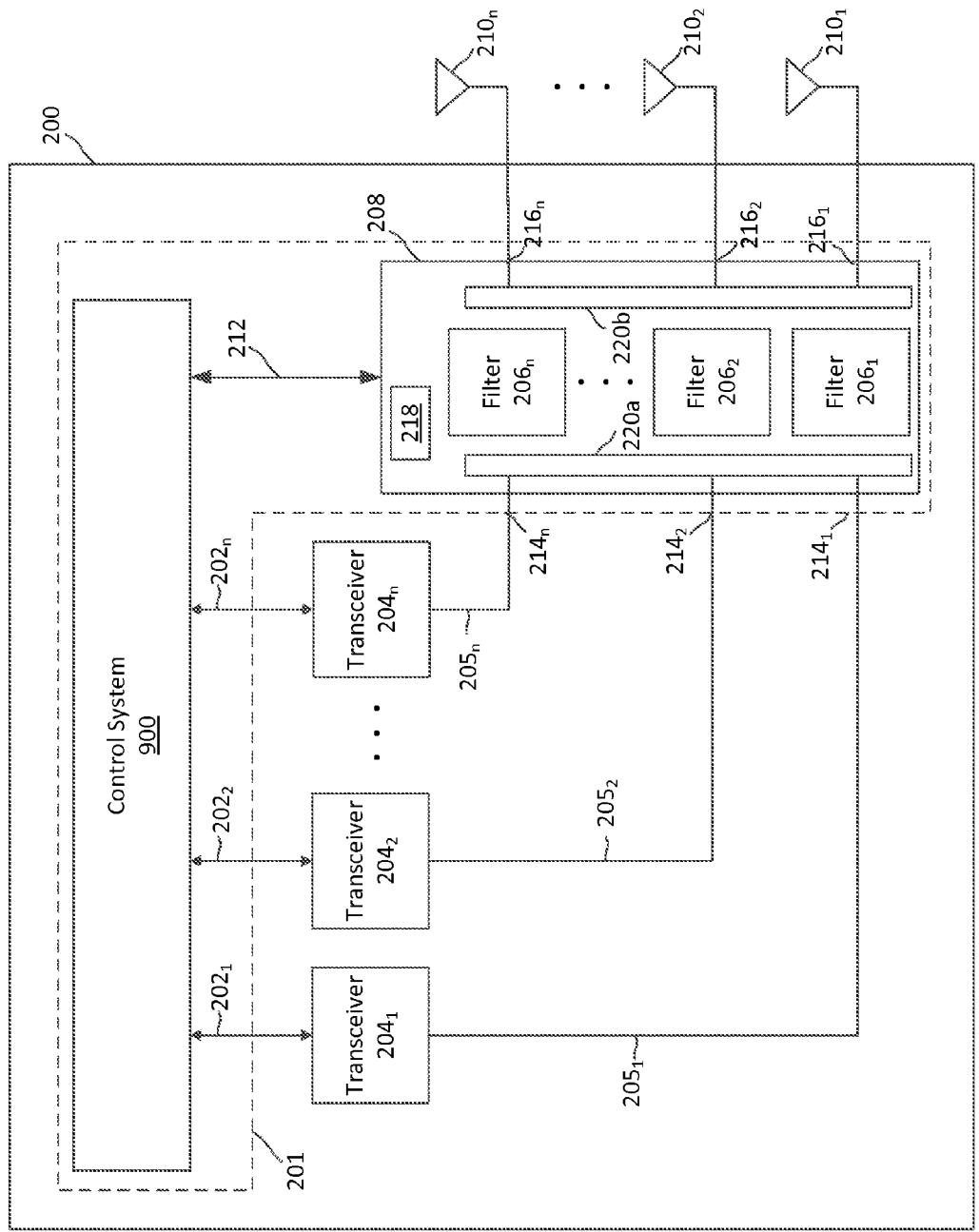
FIG. 2 is a drawing that is useful for understanding a system for mitigating co-site interference.

Referring now to FIG. 2, there is shown an exemplary embodiment of an automated co-site interference mitigation ("CSIM") system 201 designed to dynamically identify and mitigate co-site interference. The CSIM system can be implemented in any scenario involving potential co-site interference. Thus, a plurality of transceivers $204_1, 204_2, \ldots 204_n$ at a site 200 can be located at the same geographic location (a communication facility), disposed on the same physical platform (e.g. a vehicle), or they can be integrated into the same device (e.g., a multi-transceiver radio). Likewise, the antennas $210_1, 210_2, \ldots 210_n$ can be situated in close proximity at a communication site 200 (e.g. on the same antenna tower, on the same vehicle or on the same multi-transceiver device chassis).

The system 201 includes a control system 900 and a filter bank 208 which operates under the command of the control system. A control interface 212 facilitates communication of control signals from control system 900 to the filter bank 208, and communication of operating data from the filter bank to the control system. The filter bank includes a plurality of filters $206_1, 206_2, \ldots 206_n$ which are configured for filtering RF signals. The filters can be selectively interposed between a transceiver and its respective antenna $210_1, 210_2, \ldots 210_n$ along an antenna feed line $205_1, 205_2, \ldots 205_n$ in response to signals received from the control system 900. The filter bank can also include additional circuitry for detecting faults such as high VSWR.

In some embodiments, the filter bank 208 can comprise a plurality of filters having fixed operating characteristics (e.g., passband, stop-band, etc.) and a switching matrix 220a, 220b configured for routing signals to a particular one of the filters as specified by the control system 900. More particularly, the switching matrix can route RF signals between respective ones of transceiver ports $214_1, 214_2, \ldots 214_n$ and antenna ports $216_1, 216_2, \ldots 216_n$ through a selected one of the filters $206_1, 206_2, \ldots 206_n$. The switching matrix 220a, 220b can also selectively cause RF signals from transceiver ports $214_1, 214_2, \ldots 214_n$ and antenna ports $216_1, 216_2, \ldots 216_n$ to bypass the filters $206_1, 206_2, \ldots 206_n$ so that such signals are instead communicated directly from each transceivers to its respective antenna without performing any RF filtering in the filter bank 208.

As an alternative to using a bank of filters with fixed transfer characteristics, one filter $206_1, 206_2, \ldots 206_n$ can be provided for each corresponding pair of transceiver ports $214_1, 214_2, \ldots 214_n$ and antenna ports $216_1, 216_2, \ldots 216_n$. In such an embodiment, each filter $206_1, 206_2, \ldots 206_n$ can be configured as a tunable filter which is responsive to control signals from control system 201. Each tunable filter can be controlled to provide a desired set of operating characteristics (e.g., passband, stop-band, etc.) as specified by the control system. In that scenario, the switching matrix 220a, 220b can primarily function to permit RF signals to selectively bypass one or more of the filters $206_1, 206_2, \ldots 206_n$ as conditions may require. Switching matrices and tunable filters are well known in the art and therefore will not be described here in detail. However, it should be understood that the filters and any switching matrix are preferably low insertion loss devices designed to accommodate signal power levels consistent with those transmitted by any of the transceivers $204_1, 204_2, \ldots 204_n$.

Transceiver information concerning the operating status andor characteristics of the transceivers $204_1, 204_2, \ldots 204_n$ is advantageously provided to the control system 900. The transceiver information can help facilitate a determination as to the most appropriate measures to be taken for purposes of mitigating co-site interference. The extent of the available transceiver information will affect the way in which the control system functions to determine an appropriate interference mitigation scheme. In this regard it should be understood that the extent of the transceiver information available for input into the system under various circumstances can be categorized as minimal, moderate or extensive. For example, if the transceiver information is generally limited to the transmitter operating frequency and the power level, then the extent of the available transceiver information is deemed minimal.

If the transceiver information also includes other information such as order of magnitude information regarding transmitter phase noise and receiver blocking performance, then the extent of available transceiver information can be differentiated from the minimal information scenario described above. In such a scenario, the overall level of information could be described as comprising a moderate level of information. For example, one could designate an available level of information as "moderate" where the information included transmitter power, frequency, and waveform, and further included order of magnitude information with respect to transmitter phase noise and receiver blocking performance. As used herein, order of magnitude information concerning transmitter phase noise and receiver blocking performance refers to an estimate of the referenced information which is presented as a single overall system value. In reality, the actual values would be frequency dependent. Accordingly, the order of magnitude representation described herein may be contrasted with a more precise representation which would specify these receiver or transmitter characteristics as a function of frequency.

Other scenarios can also be envisioned. For example, in some situations extensive information can be available with regard to the plurality of transceivers $204_1, 204_2, \ldots 204_n$. Such information might include (in addition to the information specified above) transmitter phase noise specified as a function of frequency. The information could also include transmitter harmonic filtering, receiver harmonic filtering, a value specifying receiver noise figure and a value specifying receiver blocking performance figures. In addition, such transceiver information could advantageously include information sufficient to specify the extent of isolation which exists between and among antennas $210_1, 210_2, \ldots 210_n$.

Transceiver information concerning the operating status andor characteristics of the transceivers $204_1, 204_2, \ldots 204_n$ can be provided to the control system 900 by various means. For example, in some embodiments, the available information can be manually entered into the control system by a user, after which the information can be stored in a memory location associated with the control system. For example, the user can directly enter into the control system (e.g. using a keypad or keyboard) known information concerning transmitter frequency and transmitter power level.

As an alternative to a user manually entering transceiver information data, such information can be acquired automatically and dynamically by the control system. For example, transmitter power and frequency can be dynamically detected in filter bank 208 using one or more sensors 218 and this information can then be communicated to the control system 900 by way of a wired or wireless control interface 212. In some embodiments of the invention, the transceivers $204_1$, $204_2, \ldots 204_n$ can also be configured to communicate certain transceiver information directly to the control system 900. One or more wired or wireless data communication interfaces $202_1, 202_2, \ldots 202_n$ can be used for this purpose. The transceiver information thus communicated can include any one or more of the information types described above with regard to minimal, moderate and extensive levels of information. For example, the communicated transceiver information can include transmitter power output, frequency, and waveform type. The transceiver information can also include phase noise specified as an order of magnitude or as a function of frequency. The transceiver information could also include transmitter harmonic filtering information, receiver harmonic filtering information, a value specifying receiver noise figure andor a value specifying receiver blocking performance, and antenna isolation data. Other transceiver information can also be communicated to the control system and the examples provided herein are not intended to limit the invention.

It will be appreciated that some transceiver information is dynamic and must be actively provided to the control system 201. Such data can be provided either by manually entering such data, sensing the data using one or more sensors 218, or by communicating the data directly from the transceivers using communication interfaces $202_1, 202_2, \ldots 202_n$. However, certain transceiver information is of a fixed nature andor can be presented in a database form. For example, transceiver phase noise as a function of frequency could be presented this way. Accordingly, the control system 201 can include one or more data storage devices in which certain transceiver information can be stored. In such a scenario, the transceiver information can be accessed by the control system 201 when a user manually identifies a particular transceiver model or type. Alternatively, the control system 201 can use the communication interfaces $202_1, 202_2, \ldots 202_n$ to interrogate each transceiver to obtain transceiver model andor type information. Based on this transceiver identification information, the control system could then automatically query its database to ascertain detailed transceiver information applicable to a particular transceiver.

As noted above, the transceiver information which is available can vary in different scenarios. For example, the amount and quality of transceiver information can be minimal, moderate or extensive. Given the foregoing, the manner in which the control system selects an applicable filter $206_1, 206_2, \ldots 206_n$ will advantageously vary depending upon the type and extent of available transceiver information.

Notably, when the available transceiver information is sufficient to conclude that no co-site interference is likely to occur, then it is preferable to avoid the use of filters $206_1, 206_2, \ldots 206_n$. Such filters inevitably have a certain amount of insertion loss which will cause a reduction in transmitted power and an increase in the receiver noise figure. Accordingly, when not required to mitigate co-site interference, one or more of the filters $206_1, 206_2, \ldots 206_n$ are advantageously bypassed. Still, a determination to bypass co-site filtering requires significant amounts of knowledge. And such information may not always be available. In fact, it is not possible to reliably determine whether such filtering is needed to avoid co-site interference in situations where there is only minimal system knowledge available. Also, in the absence of sufficient knowledge, the decision making process requires a more conservative approach. Additional transceiver information allows the evaluation of co-site filtering needs to proceed in a more nuanced way. For example, in those scenarios where extensive system knowledge exists, precise mathematical modeling can be used to potentially exclude the need for filtering whereas in the absence of such information, filtering would be used as a precautionary measure.

Figure 3:
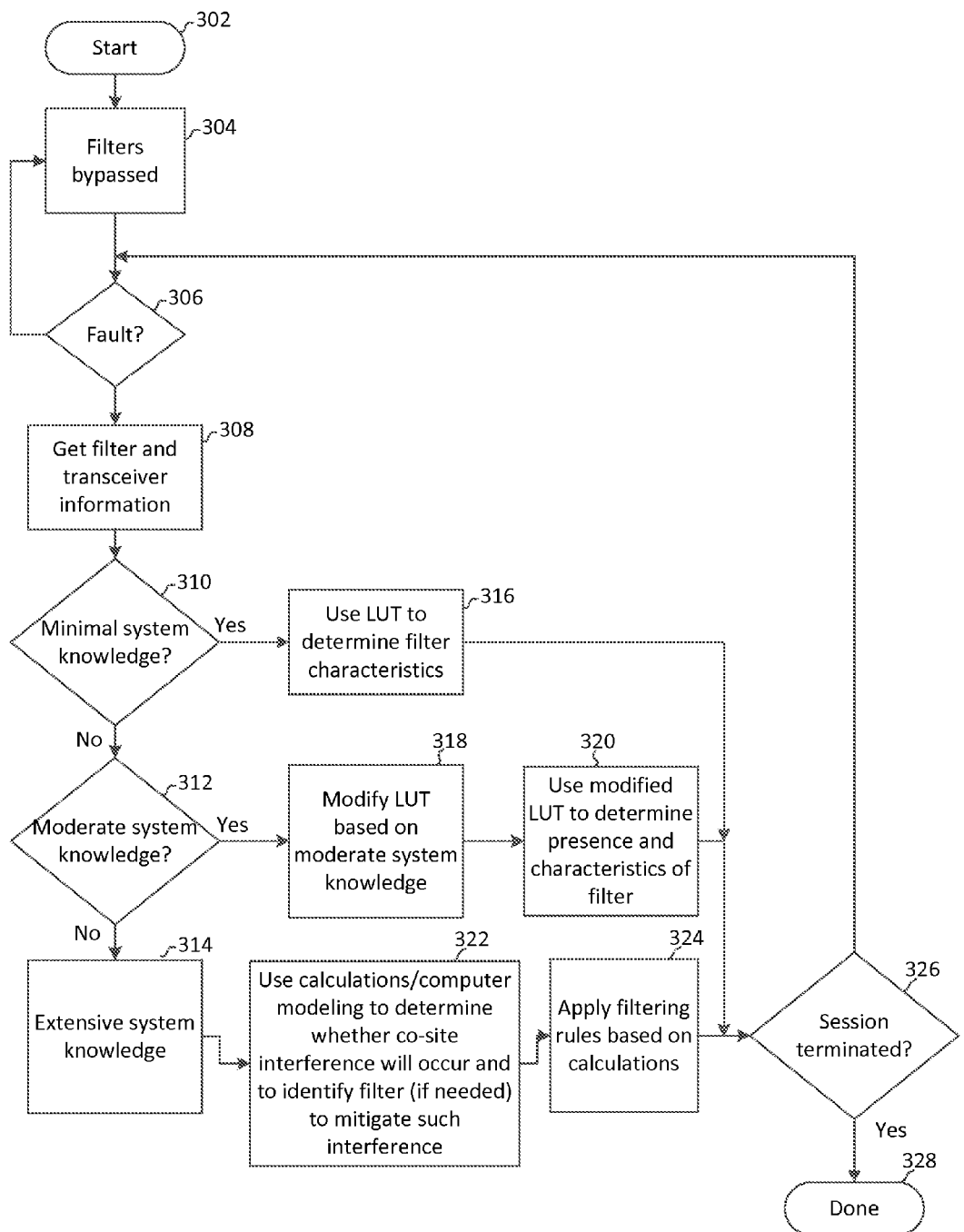
FIG. 3 is a drawing that is useful for understanding a process for mitigating co-site interference.

Referring now to FIG. 3, there is shown a flowchart which is useful for understanding the way in which the process for mitigating co-site interference can vary depending upon the available transceiver information. The process can begin at 302 and continues on to 304 where the system is initialized by bypassing all of the filters $206_1, 206_2, \ldots 206_n$. The initialization process continues with step 306 by checking to determine if there are any faults reported by the filter bank 208. Thereafter, at 308 the control system 201 accesses its memory and or data buffers to determine the available transceiver information. The information which is accessed can include information which has been manually entered by the user, information communicated to the control system from the filter bank 208, information communicated directly from the transceivers using communication interfaces $202_1, 202_2, \ldots 202_n$, andor information obtained from any pertinent databases accessible to the control system based on the other sources of information.

After all available transceiver information has been identified in 308, a determination is made with regard to the state of the available knowledge concerning transceivers at the site (e.g. site 200). More particularly, the control system determines whether there exists minimal system knowledge, moderate system knowledge or extensive system knowledge. Where there is only minimal system knowledge (310: Yes) a conservative approach must be adopted for co-site filtering to accommodate worst case scenarios with respect to transceiver performance andor antenna isolation. Accordingly, when there is only minimal system knowledge available, the control system 900 will choose to always perform co-site filtering on each transceiver using filters $206_1, 206_2, \ldots 206_n$.

Selection of the appropriate filter for each transceiver is preferably made at 316. The selection can be based on a look-up table (LUT) or database. For each transceiver, the LUT can specify a particular one of the filters $206_1, 206_2, \ldots 206_n$ having a fixed transfer function, or can specify how a tunable filter is to be adjusted to have certain desired transfer characteristics (pass-band, stop band, and so on). In either case, the LUT will specify in step 316 the most appropriate filter for each transceiver so as to mitigate potential co-site interference, given the limited available transceiver information. No filters can be bypassed because insufficient information is available to exclude the possibility of co-site interference.

Referring now to FIG. 4, there is shown an exemplary LUT 400 that can be used at step 316 for a scenario involving two transceivers, namely Radio Module 1 (RM1) and Radio Module 2 (RM2), which are located at a particular site (e.g. site 200). To use the LUT, the system first identifies an operating frequency band which is to be used by each of RM1 and RM2. The system then selects the appropriate filters by identifying the column corresponding to the operating frequency of RM1 and the row corresponding to the operating frequency of RM2. The correct filter selection is specified by the cell of the LUT where the selected column and row intersect. For example, if RM1 has a frequency between 108-224.999 MHz and RM2 has a frequency of between 1625-1890 MHz, then the control system would be instructed to use the filters identified in box 402. Specifically, RM1 would use filter B1 (corresponding to Band 1) and RM2 would use filter B7 (corresponding to B2). Similarly, for the conditions corresponding to cell 404, filters (i.e., RM1=1350-1525 MHz, RM2=1625-1890 MHz), filter B6 is indicated for RM1 and B7 is indicated for RM2.

Referring once again to FIG. 3, if the available transceiver information is not minimal (310: No), the system next determines whether the available information comprises a moderate level of system knowledge. If so (312: Yes), then the system is essentially concluding that it has enough information to selectively identify at least some scenarios in which one or more filters $206_1$, $206_2$, ... $206_n$ can be bypassed without risk of co-site interference. Thereafter, in step 318, the LUT is selectively modified based on the available transceiver information to specify conditions under which co-site filtering can be bypassed. The LUT is then used at 320 to determine whether a filter $206_1$, $206_2$, ... $206_n$ should be bypassed in the operating scenario specified by the transceiver information. If a filter cannot be bypassed without the risk of co-site interference, the LUT will specify a filter (or a filter transfer characteristic) which is appropriate based on the available transceiver information.

There is shown in FIG. 5 an exemplary LUT 400a which has been modified at step 318 as compared to the LUT 400. For example, it can be observed that the filters specified in cell 402a are different as compared to the filters specified in cell 402. Specifically, in cell 402a, the LUT has now been modified to indicate that for the conditions as specified, the filters for each of the transceivers RM1 and RM2 can be bypassed. This reflects the preference for avoiding the use of such filters when the available transceiver information suggest that there is little potential for co-site interference. Conversely, for the conditions corresponding to cell 404a, filters (i.e., RM1=1350-1525 MHz, RM2=1625-1890 MHz), filters B6 and B7 are still indicated.

Referring once again to FIG. 3, if the available transceiver information is not minimal or moderate, then the system concludes at 314 that there is extensive system knowledge available. In a scenario where the control system has available to it extensive system knowledge, the LUT can be modified or refined further to potentially indicate additional scenarios where one or more filter $206_1$, $206_2$, ... $206_n$ can be bypassed. However, in a preferred embodiment the detailed information can be used at step 322 to facilitate precise computer modeling of the communication system as implemented at site 200. This modeling can facilitate a highly nuanced approach for determining when one or more filter $206_1$, $206_2$, ... $206_n$ should be used (or bypassed) and the required transfer characteristics of those filters when they are needed. The modeling can take account of all relevant aspects of transceiver system behavior at site 200, including isolation among the various antennas. Once such modeling is completed, the necessary filters can be bypassed or connected at 324 by means of the switching matrix 220a, 220b. If tunable filters are used, the transfer function of the filters can also be adjusted at this step to provide the required filtering.

At 326 a determination is made as to whether the filtering session is to be terminated. For example, co-site filtering can be discontinued if the communication site 200 is shut down or suspended for maintenance. If so, then the process terminates at 328; otherwise the process returns to step 306 where the process continues. Notably, any changes in the transceiver information will be dynamically identified at 308 so that an necessary modifications can be made with regard to the filtering performed by the filter band 208.

As noted above, there are some scenarios in which the control system 900 can have available to it extensive transceiver system information which can facilitate computer modeling. Typically, such extensive system knowledge will include data specifying antenna isolation versus frequency, for all antenna combinations of interest. Similarly, the control system will have information concerning important transceiver radio module specifications and operating details, including a lookup table for phase noise as a function of frequency. The decision to use or bypass co-site filters as described herein will depend at least in part on whether or not the antennas provide enough isolation between the in-band transmit noise power and the receive sensitivity level. This can be determined from the following equations:

In-Band Transmit Noise Power (dBm):

$$PN(|f_{TX}-f_{RX}|)(dBc/Hz)+P_{TX}(dBm)+10\log(BW)$$

Receiver Sensitivity (dBm):

$$P_{TN}(dBm)+10\log(BW)+NF_{RX}(dB)+SNR$$

where:
PN is the transmit phase noise at a certain offset frequency
$NF_{RX}$ is the noise figure of the radio module.
$P_{TX}$ is the transmit power, and
BW is the bandwidth of the radio channel
$P_{TN}$ is the thermal noise power is constant, −174 dBm for a 1 Hz bandwidth.
A target SNR of at least 10 or 12 is usually the desired goals assumed.

In the harshest communication conditions, filtering is required both at the transmitter side of a communications link, as well as the receive side. Specifically, phase noise present at the receiver, at the desired receive frequency of operation input can only be mitigated (in practice) by way of transmitter filtering. Conversely, receiver blocking due to relatively high power nearby transmissions can only be mitigated (in practice) by way of a receive side filter. Thus, a comprehensive co-site mitigation solution for harsh conditions would require filtering at both the transmitter output and receiver input. For example, with reference to FIG. 2, such a scenario might occur when a first transceiver $204_1$ is transmitting at a transmit frequency and a second transceiver $204_2$ is concurrently trying to receive at a receive frequency, where the receive frequency is close in frequency relative to the transmit frequency. In such scenarios, it is anticipated that two filters could be required; one for transmitted signals and one for received signals. In such scenarios, the switch matrix 220a, 220b can be used to insert the required filter as needed. Applications requiring such two channel co-site mitigation, can be determined based upon the frequency separation of the two radio modules and the blocking specification for frequency offset, specific to the radios. For many receivers, the potential for blocking at a receiver in the presence of two RF signals $f_{TX}$, $f_{RX}$ can be assumed to occur when the frequency difference between the two signals is less than 10-20%, which value will represent the radio blocking specification. In such a scenario, the receiver filters will be applied if the following relationship is not upheld:

$$\frac{|f_{TX}-f_{RX}|}{\max(f_{TX},f_{RX})} \geq \text{Radio Blocking Specification}$$

where:
$f_{TX}$ is the transmitter frequency, and
$f_{RX}$ is the receiver frequency The invention is not limited to the computer modeling described herein and other calculations andor modeling can be performed for evaluating co-site interference when there is extensive knowledge available. In fact any suitable computer modeling can be used for this purpose provided that it is useful for determining whether filtering is needed to prevent co-site interference, and if so, to identify what the transfer characteristics of such filters should be. Such alternative modeling solutions can be used for purposes of identifying filters to be selected andor bypassed from filter bank 208.

The methods described herein can be implemented on a computer system. More particularly, a control system for implementing the methods (e.g. control system 900) can comprise various types of computing systems and devices, including a server computer, a client user computer, a personal computer (PC), a tablet PC, a laptop computer, or a desktop computer. The control system can also include dedicated hardware and software including at least one computer processing device capable of executing a set of instructions (sequential or otherwise) that specifies actions to be taken by that device. Further, while a single control system 900 is illustrated, the phrase "control system" shall be understood to include any collection of computing devices that individually or jointly execute a set (or multiple sets) of instructions to perform any one or more of the methodologies discussed herein.

Figure 6:
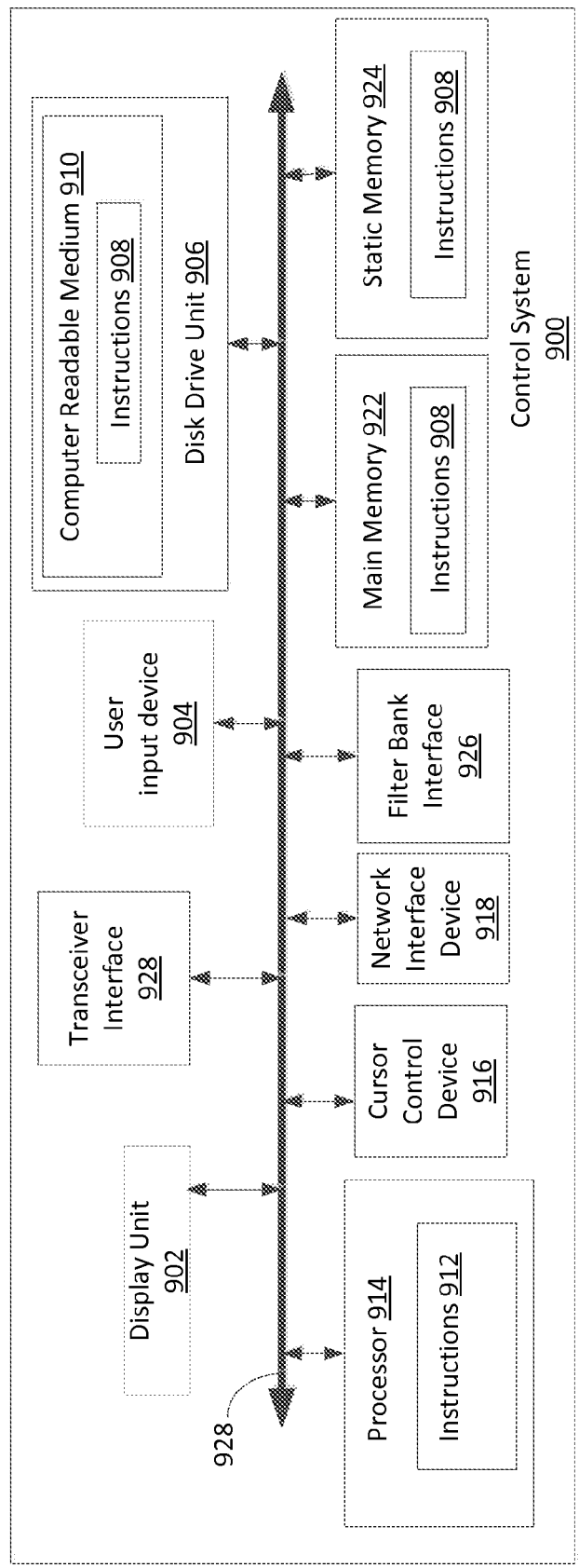
FIG. 6 is a block diagram which is useful for understanding a computer system for implementing the co-site mitigation methods described herein.

Referring now to FIG. 6, a control system 900 includes a processor 914 (such as a central processing unit (CPU), a disk drive unit 906, a main memory 922 and a static memory 926, which communicate with each other via a bus 928. The control system 900 can further include a display unit 902, such as a video display (e.g., a liquid crystal display or LCD), a flat panel, or a solid state display. The control system 900 can include a user input device 904 (e.g., a keyboard), a cursor control device 916 (e.g., a mouse) and a network interface device 918.

The disk drive unit 906 includes a computer-readable storage medium 910 on which is stored one or more sets of instructions 908 (e.g., software code) configured to implement one or more of the methodologies, procedures, or functions described herein. The instructions 908 can also reside, completely or at least partially, within the main memory 922, the static memory 924, andor within the processor 914 during execution thereof by the control system. The main memory 922 and the processor 914 can also include machine-readable media.

A transceiver interface device 928 can be used to facilitate data communications with one or more of the transceivers $204_1, 204_2, \ldots 204_n$. Similarly, a filter bank interface device can be used to facilitate communications with filter bank 208. In the various embodiments of the present invention a network interface device 916 connected to a network environment can be used to communicates over a network using the instructions 908. For example, such network interface can be used to access a database, to communicate with the transceivers, or to communicate with filter bank 208.

Those skilled in the art will appreciate that the control system architecture illustrated in FIG. 6 is one possible example of a control system. However, the invention is not limited in this regard and any other suitable control system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, componentobject distributed processing, parallel processing, virtual machine processing, which can also be constructed to implement the methods described herein. While the computer-readable storage medium 910 is shown in an exemplary embodiment to be a single storage medium, the term "computer-readable storage medium" should be taken to include a single medium or multiple media (e.g., a centralized or distributed database, andor associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for mitigating interference among a plurality of transceivers communicating using RF signals and located in close physical proximity, comprising:

receiving at a computer processor information concerning at least an operating frequency and a transmitter power output associated with each of said plurality of transceivers;

if available, also receiving at said computer processor detailed transceiver information other than said operating frequency and said transmitter power output for at least one of said plurality of transceivers;

determining, with said computer processor based on said information and said detailed transceiver information when available, whether optional RF filtering should be used to limit RF signals which are communicated to or from each transceiver in order to mitigate interference among said plurality of transceivers; and if said determining indicates that said optional RF filtering should be used, then automatically selectively performing said optional RF filtering to mitigate said interference;

wherein said detailed transceiver information is selected from the group consisting of a transmitter noise profile, a value specifying receiver blocking performance, and a transmitter output waveform.

2. The method according to claim 1, wherein said information concerning said operating frequency and said transmitter power output is obtained by monitoring an output of said plurality of transceivers.

3. The method according to claim 1, wherein said selective determination as to whether said optional RF filtering should be used is based on a calculation utilizing said detailed transceiver information.

4. A method for mitigating interference among a plurality of transceivers communicating using RF signals and located in close physical proximity, comprising:

receiving at a computer processor information concerning at least an operating frequency and a transmitter power output associated with each of said plurality of transceivers;

determining with said computer processor based on said information whether optional RF filtering should be used to limit RF signals which are communicated to or from each transceiver in order to mitigate interference among said plurality of transceivers; and if said determining indicates that said optional RF filtering should be used, then automatically selectively performing said optional RF filtering to mitigate said interference;

wherein said determining step comprises determining that said optional RF filtering should be used if detailed transceiver information other than said operating frequency and said transmitter power output is lacking for at least one of said plurality of transceivers; and wherein said detailed transceiver information is selected from the group consisting of a transmitter noise profile and a receiver blocking performance.

5. A method for mitigating interference among a plurality of transceivers communicating using RF signals and located in close physical proximity, comprising:

receiving at a computer processor information concerning at least an operating frequency and a transmitter power output associated with each of said plurality of transceivers;

determining with said computer processor based on said information whether optional RF filtering should be used to limit RF signals which are communicated to or from each transceiver in order to mitigate interference among said plurality of transceivers; and if said determining indicates that said optional RF filtering should be used, then automatically selectively performing said optional RF filtering to mitigate said interference;

wherein said determining step comprises determining that said optional RF filtering should be used if detailed transceiver information other than said operating frequency and said transmitter power output is lacking for at least one of said plurality of transceivers; and wherein at least one of a passband and a stop band of said optional RF filtering is determined in accordance with a pre-defined look-up table when said detailed transceiver information is lacking.

6. A method for mitigating interference among a plurality of transceivers communicating using RF signals and located in close physical proximity, comprising:

receiving at a computer processor information associated with each of said plurality of transceivers, including at least an operating frequency, a transmitter power output, and detailed transceiver information other than said operating frequency and said transmitter power output;

selectively determining with said computer processor based on said information whether optional RF filtering should be used to limit RF signals which are communicated to or from each transceiver in order to mitigate interference among said plurality of transceivers; and if said determining indicates that said optional RF filtering should be used, then automatically selectively performing said optional RF filtering to mitigate said interference;

wherein said selective determination as to whether said optional RF filtering should be used is based on a look-up table, and wherein said look-up table is selectively dynamically modified based on said detailed transceiver information.

7. The method according to claim 6, wherein said look-up table specifies conditions under which said optional RF filtering is bypassed based on said detailed transceiver information.

8. The method according to claim 6, wherein at least one of a passband and a stop band of said optional RF filtering is determined in accordance with pre-defined entries in said look-up table if said selective determination indicates that said optional RF filtering should be used.

9. The method according to claim 6, wherein said detailed transceiver information includes at least one of transmitter phase noise as a function of frequency, receiver blocking performance, receiver harmonic filtering and receiver noise figure.

10. A method for mitigating interference among a plurality of transceivers communicating using RF signals and located in close physical proximity, comprising:

receiving at a computer processor information associated with each of said plurality of transceivers, including at least an operating frequency, a transmitter power output, and detailed transceiver information other than said operating frequency and said transmitter output power;

selectively determining with said computer processor based on said information whether optional RF filtering should be used to limit RF signals which are communicated to or from each transceiver in order to mitigate interference among said plurality of transceivers; and if said determining indicates that said optional RF filtering should be used, then automatically selectively performing said optional RF filtering to mitigate said interference; and wherein said detailed transceiver information includes at least one of a transmitter noise profile, a receiver blocking performance, and a transmitter output waveform.

11. A method for mitigating interference among a plurality of transceivers communicating using RF signals and located in close physical proximity, comprising:

receiving at a computer processor information associated with each of said plurality of transceivers including at least an operating frequency, a transmitter power output, and detailed transceiver information other than said operating frequency and said transmitter power output;

selectively determining with said computer processor based on said information whether optional RF filtering should be used to limit RF signals which are communicated to or from each transceiver in order mitigate interference among said plurality of transceivers;

if said determining indicates that said optional RF filtering should be used, then automatically selectively performing said optional RF filtering to mitigate said interference;

wherein said selective determination as to whether said optional RF filtering should be used is based on a calculation utilizing said detailed transceiver information; and wherein said calculation includes an evaluation of at least one input variable which specifies an isolation as between a first antenna associated with a first transceiver of said plurality of transceivers and a second antenna associated with a second transceiver of said plurality of transceivers.

12. The method according to claim 11, wherein said isolation is determined using at least one of a look-up table and a co-site automatic link establishment (ALE) process.

13. A system for mitigating interference among a plurality of transceivers communicating using RF signals and located in close physical proximity, comprising:

a co-site filter bank comprising a plurality of RF filters which can be optionally selectively inserted in an antenna input/output path of said plurality of transceivers; and a computer processor configured to receive information concerning at least an operating frequency and a transmitter power output associated with each of said plurality of transceivers, if available, also receiving at said computer processor detailed transceiver information other than said operating frequency and said transmitter power output for at least one of the plurality of transceivers, determine, based on said information and said detailed information when available, whether optional RF filtering should be used to limit RF signals which are communicated to or from each of said plurality of transceivers in order mitigate co-site interference, and automatically selectively performing said optional RF filtering using said co-site filter bank to mitigate said interference if said computer processor determines that said optional RF filtering should be used;

wherein said detailed transceiver information is selected from the group consisting of a transmitter noise profile, a value specifying receiver blocking performance, and a transmitter output waveform.

\* \* \* \* \*